Oct. 20, 1931. E. G. GAGE 1,828,531
RADIANT ENERGY DISTANCE DETERMINING SYSTEM AND APPARATUS
Filed Dec. 26, 1930 5 Sheets-Sheet 3

Fig. 1b.

INVENTOR
EDWARD G. GAGE
BY
ATTORNEY

Oct. 20, 1931.                E. G. GAGE                1,828,531

RADIANT ENERGY DISTANCE DETERMINING SYSTEM AND APPARATUS

Filed Dec. 26, 1930    5 Sheets-Sheet 5

INVENTOR
EDWARD G. GAGE
BY
ATTORNEY

Patented Oct. 20, 1931

1,828,531

UNITED STATES PATENT OFFICE

EDWARD G. GAGE, OF BROOKLYN, NEW YORK, ASSIGNOR OF ONE-HALF TO ELECTRICAL INDUSTRIES MANUFACTURING COMPANY, OF NEW YORK, N. Y., A CORPORATION OF NEW YORK, AND ONE-HALF TO LEON ATTINGER, OF NEW YORK, N. Y.

RADIANT ENERGY DISTANCE DETERMINING SYSTEM AND APPARATUS

Application filed December 26, 1930. Serial No. 504,843.

The invention relates to a radio transmission and reception system; and more particularly to the determination of the distance between a radio transmitting station and a radio receiving station.

The present invention is a continuation in part of a prior application filed by me for Radiant energy distance determining system and apparatus, Serial No. 483,802; wherein I have disclosed the transmission and reception of a plurality of electromagnetic waves of different attenuation constants, the difference between their relative effects as received being a measure of the distance sought. In carrying out the system of the aforesaid application, provision is made for transmitting simultaneously both electromagnetic waves; and it is an object of the present invention to confine all of the transmitted signals or electromagnetic waves to a single length and thus avoid the use of more than one channel, as well as eliminating double reception which necessitates duplication of apparatus. The novel arrangement admits of determining readily the distance between moving objects, such as ships, dirigible aircraft, airplanes, submarines and the like from a stationary object such as a lighthouse, mooring mast, landing field, or mother-ship, as well as the direction thereof, in stormy or foggy weather when visual or other signals fail.

A further object of the invention is to insure a constant ratio between the two received signals to compensate for amplifier gain of signal strength. A further object of the invention is to enhance the effect of difference in attenuation of the signals by the difference in their adaptation to a given value of local oscillator amplitude, or optimum heterodyne.

A still further object of the invention resides in an indicator or meter, provided with a true and false zero calibration, for comparison of the two received signals by the same standard; and also in the provision of means for bringing at will the indicating needle of the meter to the true or false zero. Provision is also made for marking the extent of throw of the indicating needle during the reception of signals effecting alternate small and large readings.

Another object of the invention is to provide means for aural reception and comparison of signals by setting up two null points for comparison on a graduated scale, readable in miles or other suitable measure of distance.

The novel system admits of the use of a direct reading instrument for determining the distance; and the invention has for a still further object means to relay the readings thereof to a large station type instrument which may be located in the pilot's cabin of a ship or airplane to be easily read by the navigator when determining the distance and rate of progress of the ship, in accordance with the method disclosed in my aforesaid application.

The invention has for a still further object the provision of means at the transmitting station for accurately maintaining a given difference in attenuation between the two transmitted signals, and to provide means for alternately transmitting said signals at an optimum rate.

An object of the invention resides also in the provision of means for identifying not only the transmitting station but signals of low and high attenuation, as, for example, by coding a machine sender thereof. A still further object of the invention is to provide means for checking, by substitution, the results obtained.

In carrying out the invention, suitable transmitting apparatus is provided whereby signals of one wave length only and of limited range are transmitted, the wave length being preferably located within the 20,000–40,000 meter band altho any wave length permitted by the radio laws may be utilized. Two types of antennæ are utilized in the transmission of signals of the selected wave length, and the transmission is effected alternately from these antennæ, the one being designed to radiate signals having a limited range and is to this end deformed to meet the requirement. The other antenna is further deformed in order to cause the signals radiated therefrom to have a higher attenuation than those radiated from the first-named antenna. The difference in the attenuation of the signals from the two radiators or antennæ is therefore a function of their departure from the optimum natural period at the transmitted frequency; and this can be varied to suit the conditions under which the signals are to be transmitted.

For example, if the distance to be measured from a given transmitter is to be very short, say within one mile, as might be the case from a lighthouse for warning ships, then the difference in attenuation is made large, in order that the high attenuation signal may disappear beyond that distance. An accuracy in the determination of this short range is possible to within a few feet.

On the other hand, if the distance to be covered is of the order of five miles, such as might be the case from an airplane to a landing field, then the difference in attenuation is made small, in order that the weaker signal, or signal of high attenuation may carry up to that point and be of suitable value for obtaining readings. In addition, an immediate indication without calculation is always present for the receiving operator as it is heard in a loud speaker.

As an example, if only one signal is heard at two miles, with a long space between repetitions, then it is at once apparent that the observer is more than one mile from a short distance transmitter, the identification of which is made from a characteristic signal transmitted at intervals.

If the identifying signals prove to be from a long distance transmitter, and only one of the distance determining signals is heard with an appreciable interval between signals, then it is at once apparent that the transmitter is more than five miles distant.

Sometimes it is advantageous to transmit both short and long range signals and possibly an intermediate range signal from the same geographical location, in which case each transmission range is characterized by a distinctive signal, and the three signals may be transmitted in rotation, followed by a station identifying signal.

A better understanding of the operation of my improved radio distance finder, however, may be had by referring to the accompanying drawings, in which:

Figs. 1, 1a and 1b are diagrammatic views illustrating the receiving circuit and apparatus.

Fig. 6 is a detail plan view of a resistor with oscillatable measuring dial.

Referring to the drawings, 10 designates a receiving antenna of suitable height and adapted for receiving signals of all attenuations, its prime requirement being that it shall be able to receive such signals at greater intensity than received by a further receiving antenna, or rather loop 11, as used in combination therewith for determining distance by a two-null point method. The loop to this end is adapted through a coupling coil 12, to be connected in opposition to the antenna 10 or in additive relation thereto by means of a suitable pole changing switch 13, the antenna 10 in the additive relationship being used simply to augment faint signals. The receiving loop 11 is of relatively small area, approximately 3 feet square; but it may be varied to suit receiving conditions; and the coupling coil 12 mounted therein may be located in a fixed position relatively thereto to give the optimum coupling value. As hereinbefore noted, this coupling coil may be connected to reverse its direction of winding with relation to the loop through the reversing switch 13 in order to place the said loop 11 in additive relationship or in opposition to the antenna 10.

A tuning condenser 14 is shunted across the said coil 12; and a variable resistance 15, with graduated scale 16, is included in series with the antenna 10 which is grounded at 17.

The loop 11 is connected to a receiving circuit through a switch 20, a tuning condenser 21 for the loop being included in the receiving circuit. The condenser is preferably connected in series for broader range and because the potential developed at the grid of the screen-grid amplifying tube 22 is greater than with the condenser connected in shunt. A resistance 23 is connected across the grid of the said screen-grid amplifier 22, and serves to prevent accumulation of the charge upon the grid, as well as to afford a shunt path for parasitic variable disturbances.

In the output circuit from the amplifier a variable condenser 24 serves to tune both the plate circuit of the amplifier and the grid circuit of a detector tube 25, having also the series grid condenser 26 and tuned impedance 27 which is variably coupled to the loop 11 for non-critical regeneration. The detector tube 25 is thus largely free to perform its function of detecting without distortion, a grid leak for the detector tube being indicated at 28. By-pass condensers 29 and 30 are grounded across the energizing B-batteries 31 and 32, respectively. A-batteries 33 and 34 are provided respectively for the tubes 22 and 25 to energize their filaments.

but a single A-battery may be utilized for both tube, if desired, as is well understood.

Across the output circuit from the detector 25 is provided a variable resistance 35 which may be of the order of magnitude of 500,000 ohms and is adapted to control regeneration by the losser method, said resistance being by-passed for alternating current by means of a condenser 36. The output circuit is connected to the primary of an audio-frequency transformer 40 whose secondary is connected to an audio-frequency amplifying tube 41 provided with a grid leak 42. A second stage audio-frequency tube 43 is connected in the usual and well known manner to the first-stage tube 41; and it is preferred to further amplify the received signals by means of a push-pull amplifier embodying the two audio-frequency tubes 50 and 51 and input audio-frequency transformer 53 and output transformer 54. It is desirable, also, to provide the A-battery 55 and the B-battery 56 for the tubes of this push-pull unit separate from the energizing batteries of the other tubes in order to prevent any chance or possibility of undesired regeneration of radio frequency.

A suitable rectifier may be connected in the output circuit from transformer 54 and may comprise the ordinary amplifier tube 60 of low impedance with its grid and plate strapped together as indicated. A condenser 61 is shunted across the output transformer 54; and the capacity value of this condenser should be such as to be in resonance with the heterodyne note chosen for the signal which, in turn, should be low enough to permit the exclusion of frequencies above 2000 or 3000 per second. This condenser not only excludes undesired regenerated radio frequencies from the indicating instrument hereinafter described, but serves to augment by resonance the effect of the heterodyne note upon them.

The aforesaid output circuit from transformer 54 is arranged to be connected through transfer switch 75 either to a loud speaker 76 or a pair of head phones 77, the latter being utilized to determine distance with weak incoming signals by the null method hereinafter described. The aforesaid output circuit, furthermore, is connected across a suitable indicating instrument 78, such as a sensitive micro-ammeter, and this instrument is shunted by a variable resistance shunt 79. Acoustical resonance of the audio-frequency circuits is adjusted to provide maximum sound in the loud speaker at maximum reading of the meter. Two zero positions 80 and 81 respectively are provided on the graduated scale 82 of said instrument, the zero position 80 being the normal zero position of the instrument and which may be termed the true zero thereof and marked in some distinctive color, while the other zero position 81 is a false zero and an arbitrary position predetermined with relation to the strength of received signal of high attenuation. It is preferred to place the same at a point about one-fifth of the total scale from the true zero position 80, thereby allowing a reading at a point which will be of sufficient needle movement to prevent error due to near-zero readings and possible maladjustment of the needle. There is associated with this scale also a rotatable dial 83 having a zero point 84 marked thereon.

The output circuit may be connected to a further and large or station type instrument 85 suitable for use in a pilot's cabin of a ship or airplane and of such magnitude that the indications may be easily read at a considerable distance from the instrument. A switch 86 serves to connect in this larger instrument which may also be located at some remote point; and a powerful amplifier 87, which, if desired, may be of the push-pull type, is included in the larger instrument circuit. A rectifier tube 88 serves to rectify the amplified current for actuating the instrument which is provided with the suitably graduated scale 89 and has also the true zero position 90 and the false zero position 91, as in the case of the instrument 78.

To afford suitable heterodyne reception, a local oscillator 100 is arranged in proximity to the loop 11 and radiates electromagnetic waves at a frequency differing by a predetermined amount, usually about 700 cycles, from the frequency of the received signal. The particular location of this local oscillator with regard to the loop is of importance, since it serves to augment the difference in attenuation of the two received signals of different amplitude—favoring the one signal more than the other in respect to resultant intensity. When its location has once been determined upon, its position may be fixed as in locating the oscillator apparatus within the confines of a cabinet (not shown) and housing also the entire reception apparatus. A graduated scale 101 is fixed over the path of movement of the oscillator coil, when the same is to be adjusted, as hereinafter set forth.

A further local oscillator 105 may be provided to serve as a substitute for received signals in order to check results obtained. A switch 106 is provided with the said oscillator apparatus to close the energizing circuit of its oscillator tube 107, and a suitable measuring device 108, having in series with it the B-battery 109.

The variable resistance 110 is provided to insure a constant standard of plate current. The oscillator as a whole is designed to be coupled to the receiving circuit hereinbefore described through its radiating output coil 113 and a pick-up coil or loop 114 arranged to be connected to the said receiving circuit by switch 20 as the latter disconnects loop 11 therefrom.

The distance between the two coils 113 and 114 is carefully calibrated, as in inches or degrees, and translated into distance from the transmitter upon a scale 115, which distance is being checked and as will be hereinafter more fully set forth, it being understood that either the oscillator or the coil is movable.

The signals received by the aforesaid receiving circuit are derived from suitable transmitting apparatus located either at some stationary point such as a lighthouse, mooring mast, landing field and mother ship, or upon a movable object such as a ship, dirigible, airplane, submarine or the like. This apparatus embodies at least two transmitting antennæ as the antenna 120 and the antenna 121, Fig. 2 of the drawings, said antennæ having but a small fraction of the optimum period required for radiating the particular wave length chosen. As an example, if the wave length to be radiated is 30,000 meters, the optimum natural period would be approximately 15,000 meters; and with this combination if the antenna were either vertical or if the vertical portion were greater than the length of the horizontal, the range of transmission would be unlimited provided, of course, the necessary power were supplied. However, by employing an antenna of, say, 1/1000 of the optimum natural period or 15 meters in length, or 1/100 of this period or 150 meters in length, the effective range may be cut down to a desired limit with a given power.

Figure 2:
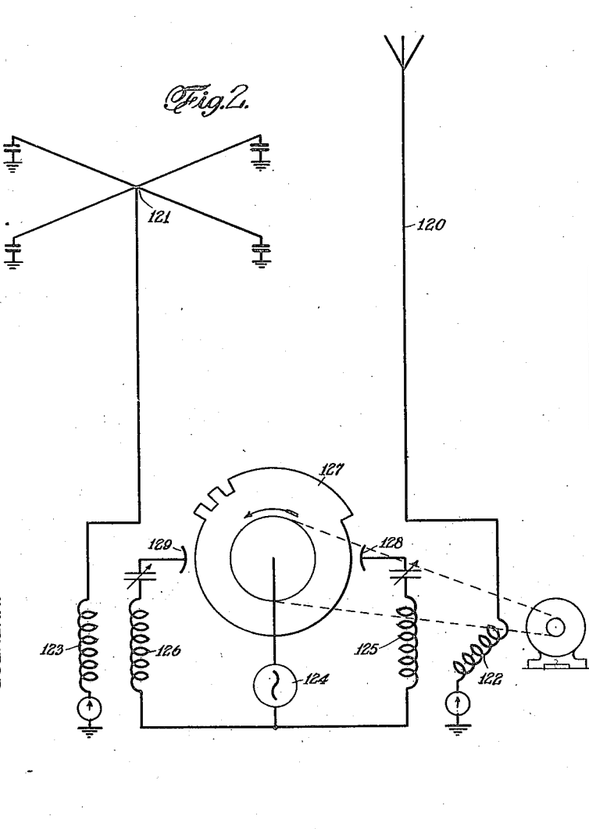
Fig. 2 is a diagrammatic view of the transmitting mechanism embodying two radiators of electromagnetic waves suitable for producing a difference in attenuation between two signals transmitted thereby.

Each of the antennæ is grounded through suitable coupling coils 122 and 123, respectively, said coils being adapted for coupling a particular antenna to a source of high frequency current. This current may be derived either from a vacuum tube generator, as is well understood, or from a high frequency alternator as indicated at 124. The current from the alternator 124 is arranged to periodically energize respective alternator coupling coils 125 and 126 associated with the coupling coils 122 and 123, respectively, as through a rotating contact-making device or machine sender and embodying the sector 127' and brushes 128 and 129, respectively, of the coupling coils 125 and 126, the latter transferring the more power.

It will be understood that when the sector makes contact with a brush 128 or 129, the particular coupling coil will be energized by current at the alternator frequency and the energy transferred through the corresponding antenna coupling coil to the antenna 120 or 121 to be radiated therefrom. By providing interrupted sector portions, suitable signals may be transmitted.

Figure 3:
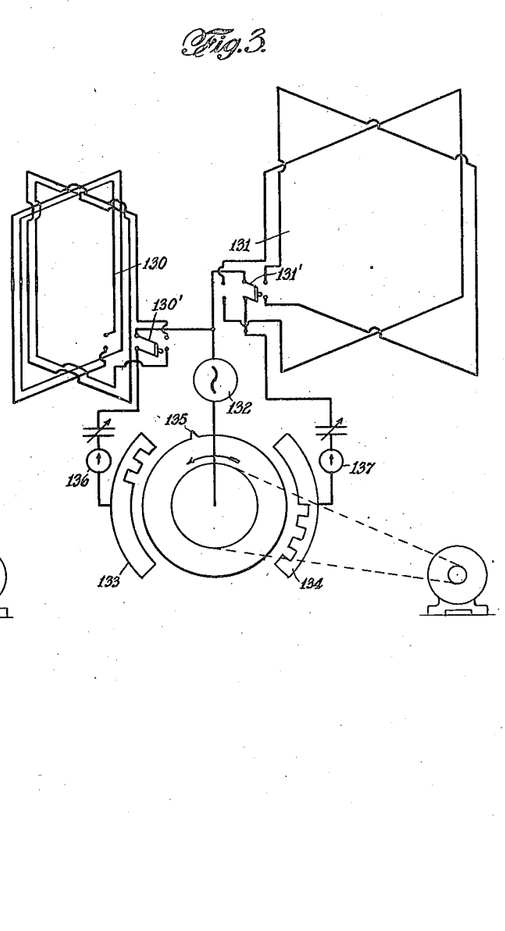
Figs. 3 and 4 are similar views illustrating modifications therein.

In Fig. 3 a different form of radiator is shown employing directional loops 130 and 131 for transmitting the high and low attenuation signals respectively.

Loop 131 is composed of a single turn, of large area, while loop 130 is composed of a plurality of turns of relatively small area to provide for different attenuation characteristics.

Loop 131 is energized at reduced primary power, while loop 130 is energized at full primary power, the relative values of power and area determining the distance of the point of "equality", hereinafter referred to.

By means of switches 130' and 131' the signals are transmitted to a north-south or east-west direction depending on the position of the throw-over switch which connects a radiator to the power supply either through a loop facing north-south, or through one facing east-west.

Transmitting loops for the high and low attenuation signals should both point in the same direction when transmitting.

The two loops 130 and 131 are arranged to be connected to a source of radio frequency 132, such as an alternator or vacuum tube generator through fixed sectors 133 and 134 respectively. The circuit to these sectors is periodically closed through a rotating brush or tooth member 135, making contact alternately with the said sectors. These sectors are notched to provide different identifying signals—in the present instance the letters U and V. With modulated signals, different note pitches may serve as identification means.

Figure 4:
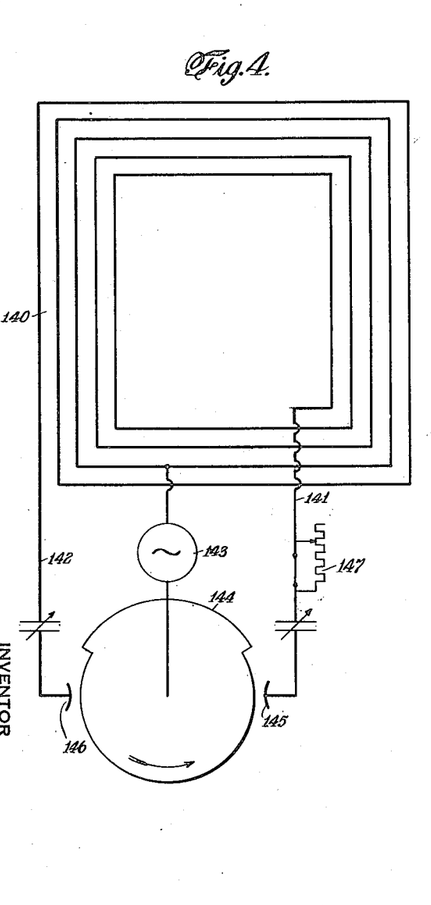

In Fig. 4 a still further form of transmitting apparatus is represented, a single loop 140 to this end being provided by having two independent taps 141 and 142, respectively, to the high frequency alternator 143. The rotating type of sector 144 similar to that described in connection with transmitting apparatus shown in Fig. 2, is employed in this embodiment, with brushes 145 and 146 designed to complete the circuits to the respective loop portions. It will be appreciated that if contact is made at the brush 146, the larger loop portion of a single turn will be effective; while if contact be made at the brush 145, a lesser area of the loop with a greater number of turns will be energized. This type of loop is also suitable for use in a horizontal position for aircraft landing fields.

Figure 5:
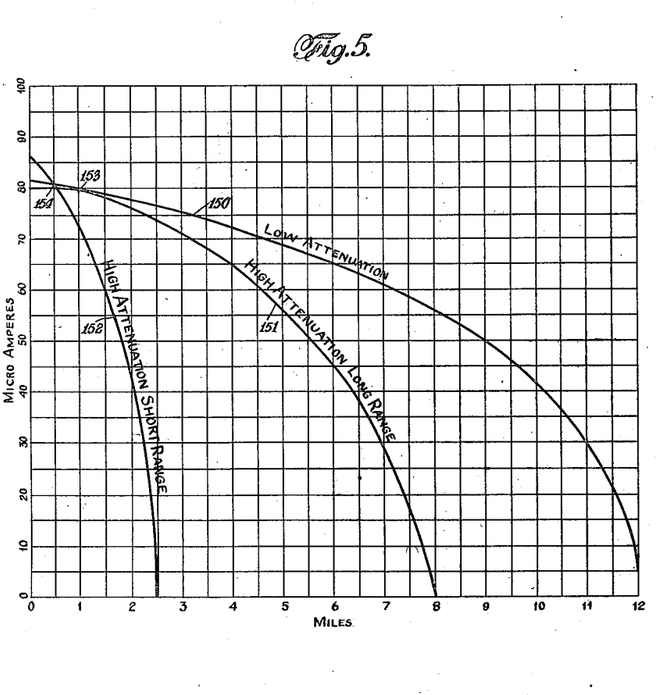
Fig. 5 represents a curve sheet illustrating the attenuations of various signals (electromagnetic waves) employed in the novel system.
Figure 10:
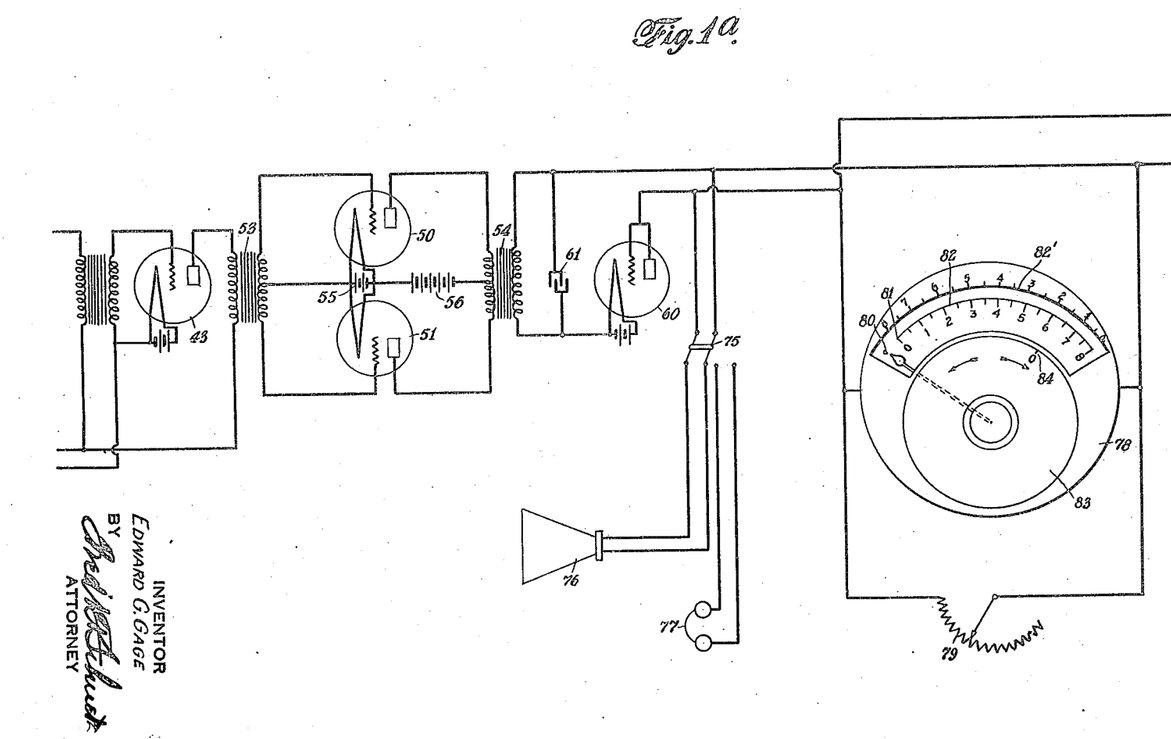

In the reception of electromagnetic waves by these various antennæ, reference being had to Fig. 5 of the drawings, the intensity of the signal of high attenuation constant will drop off more rapidly than the signal of low attenuation constant. For example, the curve 150 will represent the signal of low attenuation constant, the abscissæ representing distance, for example, in miles, and the ordinates the received current, as in micro-amperes. The curve 151 represents a signal of high attenuation constant for relatively long range, while the curve 152 represents a similar high attenuation constant signal, but for shorter range.

It will be noted that the curves 150 and 151 cross each other at the point 153 where the amplitude of both receiving signals is the same, this position being the point of "natural balance" more fully set forth in my aforesaid copending application. Similarly, curves 150 and 152 cross at the point 154 where both signals are of equal intensity. When the receiving station is located within a distance corresponding to either of these points, the attenuation ratios are reversed and the readings obtained indicate close proximity to the transmitter.

In the operation of the novel system for determining distance by radiant energy, a transmitter of the type indicated in Figs. 2, 3 and 4 is installed, for example, at an airplane landing field, while, for example, an airplane will be equipped with the receiving system hereinbefore described. In this particular embodiment of the invention, it is desirable in foggy or stormy weather that the airplane shall be able to determine accurately the distance away from as well as the direction of its landing field. In locating the transmitting apparatus, this may be provided for in one corner of the field, the exact geographical location being known to the receiving airplane; and a single tapped horizontal loop or the two antennæ or loops are erected side by side and provision made for energizing the same as hereinbefore described, so that two signals of the same wave lengths or frequency but of different attenuation constants will be radiated thereby.

Of course, in place of the high frequency alternator hereinbefore set forth for producing electro-magnetic waves of the desired frequency, the well-known vacuum tube oscillator may be employed; but in such event, care must be taken that each transmitting radiator be tuned to exactly the same frequency. Otherwise, the received signals will be of different frequencies, hence of different heterodyne values, and the resulting meter readings ambiguous.

When vacuum tube transmission is employed the power ratio between antennæ may be varied by varying the plate voltage of the transmitter at every change-over. In the provision of a signal of predetermined characteristic, such as a Morse letter, it is preferred to end the same with a dash which is slightly prolonged in order that the receiving meter needle may come to rest after the sending of the first part or dot portions of the letter so that a steady reading of the meter needle is obtainable. By having the two transmitted signals represent different letters, the two signals of high attenuation and low attenuation are more readily identified; and the combination of the two letters identifies the call letter of the transmitting station.

Duration of the transmitted signals depends largely upon the inertia of their receiving measuring devices which are preferably of the sensitive micro-ammeter type. The more sensitive meters of this type are somewhat sluggish in action, requiring a longer signal to allow the needle to come to rest than in the case of a less sensitive needle which is "snappier" in its action. The transmitting station is operated continuously, and care is had that a constant difference of attenuation is maintained between the two transmitted signals, this being of more importance than maintaining exactly the same power.

When the transmitting station is in operation, a receiving operator in the plane, for example, first tunes to the frequency known to be that of the transmitting station, which may be accomplished solely through the use of loop 11 by the usual radio compass method, the antenna 10 being reserved for measurement by the aural method for picking up signals.

Should the operator be unable to hear any signals, he knows that he is not within the predetermined range of the distance-finder transmitter of the sending station. Should he, however, be in doubt as to the receiving circuit being in proper operative condition, he may check the same by throwing in the local transmitter 105; or he may tune to a slightly shorter wave length to pick up the commercial high-power trans-Atlantic stations which are constantly transmitting on a band between 15,000 and 25,000 meters. This drop in the wave length is readily made on the condenser 21 and requires but a few moments to change.

If but one signal is picked up by the receiving circuit, with a long interval between repetitions of this signal, then the identifying letter of the signal warns the operator that he is within the predetermined range of the signal of low attenuation constant, but not within the range of the signal of high attenuation constant. As soon as the signal of high attenuation constant is picked up, the meter or other indicating device is watched for the repeated indications; and the plane is to be kept substantially in a direct line with the transmitter. This may conveniently be effected by a direction-finding loop or, preferably, by the receiving loop itself.

As the plane approaches the landing field, the meter needle will show first a slight movement for the signal of low attenuation, and then two movements—one for the latter signal, and a smaller one for the signal of high attenuation constant. When the reading on the scale resulting from the reception of the signal of high attenuation constant attains the position 81 corresponding to the false zero mark, the reading resulting from the signal of low attenuation constant will be well toward the end of the scale 82.

In some instances it is advantageous to use a rotating type of dial, as the dial 83; and to rotate this dial until its zero mark 84 is directly over the throw of the needle, or point at which it comes to rest. The reading over the false zero is then noted and the distance read off directly on the rotating dial. This arrangement of readings has the advantage that the rotating dial serves as a marker between needle movements and the distance in miles will be read off directly without calculation upon its calibrated scale.

For example, as a plane approaches the landing field, it will be necessary to reduce the pointer to the false zero for the duration of the high attenuation signal whenever a distance reading is taken; and it will be found that at each reading, as the plane approaches, the throw of the pointer for signal of low attenuation is more nearly equal to that of the signal of high attenuation. As the high attenuation signal is always adjusted to the false zero position by means of the adjustable shunt 79, before taking a reading, the indicating pointer will then show a shorter and shorter throw from the false zero for the signal of low attenuation as the plane approaches the transmitter.

In other words, the pointer throw for the signal of high attenuation is maintained at the false zero position through the aforesaid shunt, and the distance read on the scale by the throw of the pointer for the signal of low attenuation. In case the throw of the needle for a signal of high attenuation should fall below the false zero due to its considerable distance from the transmitting station, the variable resistance 35, controlling amplifier gain by regeneration, may be utilized to increase the needle throw.

When the plane approaches to within a predetermined distance from the transmitter station, which may be the boundary line of the landing field, both signals will be found to be exactly equal. That is to say, when the throw of the needle for the high attenuation signal is at the false zero through adjustment of the shunt resistance 79, then the throw of the needle for the low attenuation signal will also be at this point—indicating "no distance". This position is the point of "natural balance" hereinbefore referred to; and the same may be accurately maintained at almost any desired distance from the transmitter by varying the attenuation ratio of the two signals radiated from said transmitter.

In the case of a landing field, the most advantageous point of "natural balance" is the boundary of the landing field, because when this point has once been passed the signals of the receiving plane begin to reverse themselves and the operator then knows that he is within the bounds of the field. The reversal of the signals is made known to an operator by a longer throw of the signal of high attenuation than for the signal of low attenuation, this being just the opposite condition from what has obtained prior to passing the boundary line of the landing field. The point of "natural balance" may also be located at a specified distance directly over the landing field, to enable planes to determine their altitude.

During the taking of the various readings, the loud speaker 76 or head phones 77 may also be kept in action and serve as an immediate indicating means of the approximate distance, by the difference in intensity of the two received signals.

Similar rules govern the operation of the distance finder when located on board a ship seeking the harbor in a fog, or a ferry-boat seeking its dock, or a vessel passing a dangerous reef upon which would be located a transmitting station of the nature hereinbefore set forth; also, when the transmitter is located on a moving ship or plane and the receiver is stationary, or when both receiver and transmitter are in motion. In the latter embodiment, duplex operation involving simultaneous transmission and reception may be employed and may be of the nature more particularly set forth in my aforesaid copending application or of the conventional "break-in" system.

The method of adjusting the relative power of the two transmitters or radiators is as follows:

Radio frequency meters 136 and 137 in the circuit of each loop or open antenna indicate the current and the relative power would be approximately determined by multiplying this current by the number of turns in each loop if the loops were equal in size.

When they are of greatly different size, however, the ordinary $I^2R$ formula can be used.

The smaller loop is provided with maximum primary power, or ampere turns, and the larger loop or open antenna, when used, is provided with less energizing power depending upon the range to be covered. To facilitate the work of the transmitting operator, it may be convenient to adjust the size of the loops to allow the same current in each. When this is done, the primary power ratio between each loop is automatically kept constant by maintaining their ammeter readings at the same value.

If the point of "natural balance" referred to in my aforesaid copending application and more properly referred to herein as the point of "equality" is to be close to the transmitter, then the difference in the size of the transmitting loops must be very great, the larger loop transmitting the low attenuation signal with low power and the smaller loop the high attenuation signal at full power.

A convenient power for a large single-turn loop 100 feet square is 250 watts, with 1000-watt power for the smaller loop of 50 feet square and, say, ten turns when the point of "equality" is to be less than one-quarter mile, and the wave length approximates 30,000 meters. Such a condition would exist, for example, over an airport. A loop 140, of the character indicated in Fig. 4 and which may be horizontally disposed, is used to determine distance from the boundary of an airport when a plane is approaching it from a low altitude, a horizontal receiving loop being used at the receiver.

The vertically disposed loops of the character set forth in Fig. 3, are employed to determine the direction and the altitude of the plane when it arrives over the airport boundaries, a vertical receiving loop being used for this purpose. A combination of these two readings enables the plane pilot to determine bearings as well as distance and altitude.

In Fig. 4 it will be noted that the throw-over switches 130' and 131' allow the use of either a loop running north-south or a loop running east-west.

These switches are to be operated to connect loops of like direction to the source of power.

The switches are to be thrown either automatically or at the discretion of the transmitting operator, or at times, at the request of the receiving operator to determine bearings.

Where it is desired that planes passing over a field in a fog shall be able to tell their altitude, the system herein disclosed allows this to be very quickly approximated by the pilot noting whether he is above the point of "equality" or below it, which may be determined by the coded sectors previously described.

When the point of "equality" is more than one-quarter mile, the difference in size of the two loops should be less.

The smaller loop is always in full resonance with the radio-frequency alternator if one is used, while the larger loop may be detuned sufficiently by trial to equal the signal strength of the smaller loop at any required point of "equality" distance. Detuning the loop does not change the frequency when an alternator is used. A resistance 147 may also be used to reduce power in the loop.

Instead of detuning to reduce power, a resistance may automatically be inserted in the alternator field, or, in the case of a vacuum tube transmitter, fewer tubes may be used, the rotating switch 135 being arranged to do this automatically; or in the case of an alternator to cut in the required resistance during the sending of the low attenuation signal.

The automatic rotating change-over switch 135 should preferably give a signal of about two seconds' duration, with an interval of one-tenth second between signals.

When the distance from the transmitter is too great for the high attenuation or weaker signal to move the meter needle, but a stronger signal or low attenuation signal is able to throw the needle to a reading beyond the false zero 81, a meter reading can still be obtained in the following manner.

The local oscillators 100 and 105 are both set into operation, oscillator 105 having previously been adjusted to zero beat with the incoming signal to assure its being of the same frequency as the signal. Oscillator 100 is adjusted to beat with the signal at the desired audio-frequency—usually 700 cycles—and oscillator 105 is then moved over its associated scale 116 toward the loop 11 until the needle of the meter rests on the false zero 81 during the interval when the high attenuation or weak signal is being transmitted, but cannot be received with sufficient strength to move the needle.

The other signal, or signal of low attenuation, is to be disregarded during this adjustment. When it appears at stated intervals, it beats with the two local oscillators, making a croaking sound, and moves the meter needle. Between the reception of the stronger signal the beat note of the two oscillators will be heard in the loud speaker as a clear whistle, and the meter needle will remain over the false zero.

Oscillator 105 is now rendered inoperative by its cut-off switch 106.

The note of the stronger signal then immediately changes to a clear note matching the clear note of the two oscillators when they were both operating. The clear note of the two oscillators 100 and 105, which were beating together in the interval between the strong signals of low attenuation, now disappears when switch 106 is opened to render oscillator 105 inoperative. Briefly, the local oscillator 105 has taken the place of the signal of high attenuation.

The maximum throw of the needle from the false zero now indicates the distance, but since it varies inversely as the distance instead of directly a scale 82' reading reversely with relation to the first scale 82 must be calibrated from the transmitter.

The adjustable shunt 79 is open-circuited during the reception of weak signals just described, since the readings will not be full scale. If it is desired to use this method exclusively for stronger signals, then the weaker signal or signal of high attenuation may be dispensed with by simply opening its circuit at the transmitter and allowing only one sector 134 of the rotating switch 135 to operate the single signal of low attenuation. The stronger signal from sector 134, however, will be found sufficiently attenuated to operate over medium distances.

If it is desired to use this method for short distance measurements, then the low attenuation signal is disconnected at the transmitter and only the high attenuation signal from sector 133 is used.

When it is desired to determine distances beyond the range of apparatus involving meter readings, head telephones may be utilized to pick up the faint signals and by a two-null aural method, operating as follows:

In my aforesaid copending application, there has been disclosed a single-null aural method for determining distance by the use of head phones, said method involving two received waves of different lengths which are reduced to audio-frequency and then opposed to each other until they cancel. The particular point of cancellation is controllable by a variable resistance which is translated into a suitable unit of distance. The present embodiment is an improvement over the former method in that it involves the use of a wave of one length only and consequently but a single receiver.

Figures 1, 6:
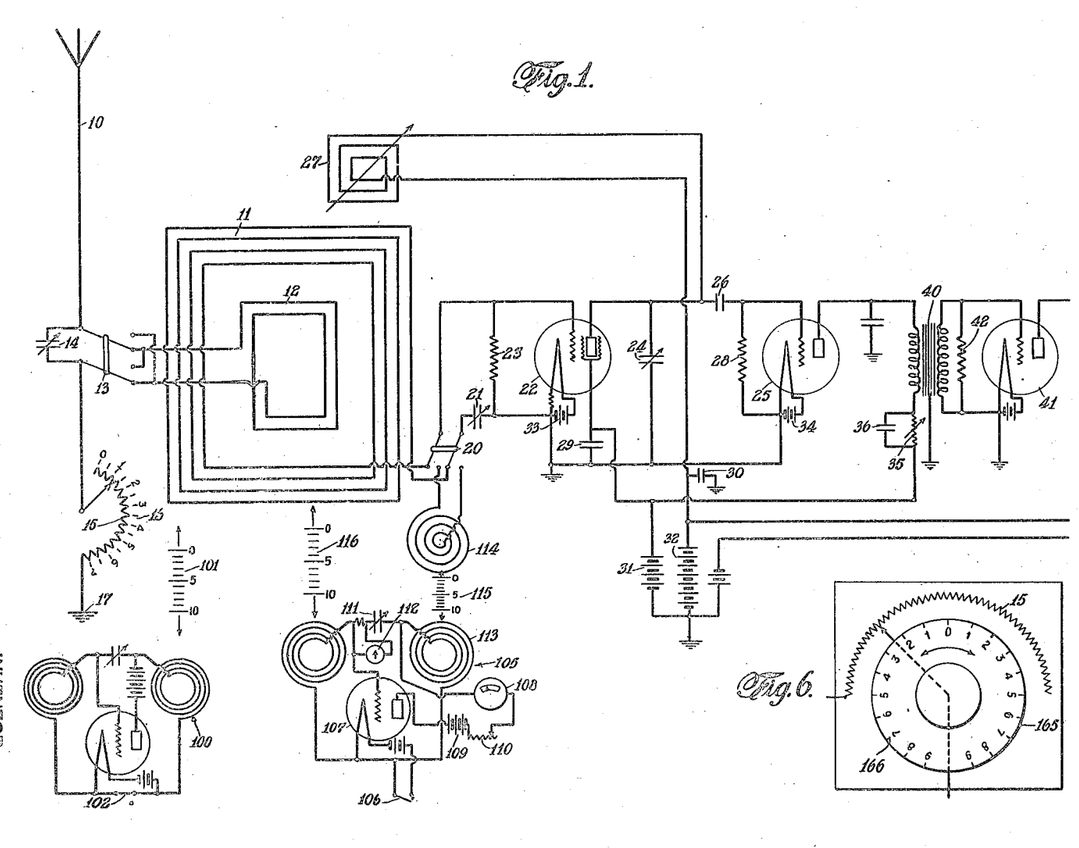
Figure 1B:
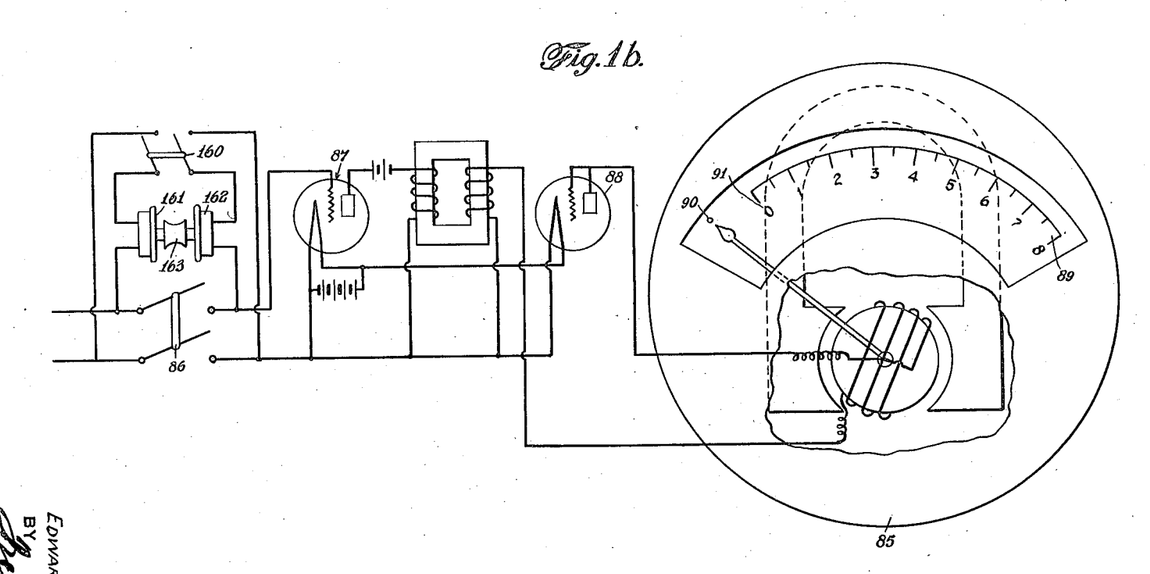

Referring to Fig. 1 of the drawings, the open circuit antenna 10 is of such proportions that it is positively a better collector of the received signals than the loop 11; and it should, preferably, be several times as effective as the said loop in picking up the radiated signals. By means of condenser 14, the antenna is tuned to the received signal and the variable resistance 15 set to zero. By means of the switch 13 the coil 12, generally coupled for optimum reception to the loop 11, is thrown into circuit in additive relation to the said loop.

Both the antenna and the loop can then independently perform the function of a collector; and when coupled together they act as collectors in parallel, when in phase and in additive relation; and when they are in phase opposition they cancel and no energy is transferred to the amplifier.

The reason for providing a more effective collector of the radiated signals than the loop for cancelling the signal received by the latter, is to insure an ample over-supply of energy in the antenna collector to allow for adjustment to effect cancellation of current in the loop through the variation of the antenna resistance. Other means of varying the resistance may be employed in balancing the current of the loop, as by a losser method, etc.

To place the antenna in phase opposition to the loop, the switch 13 is thrown over to its reversing polarity contacts; and the received signal will now be diminished in strength due to the opposing effect of the antenna upon the loop. It will be apparent, that instead of using an antenna and loop for cancellation purposes, two antennæ or two loops may be used, in opposite phase relationship and inductively connected in the conventional manner, such as in the Fessenden interference preventer. The prime requirement is that one collector shall be better than the other to allow for adjustment as by means of a series resistance, in the better collector.

Through the adjustment of the resistance 15, a point will be found where the signals of high attenuation disappear, but the signals of low attenuation will remain though diminished in intensity. This point is noted on the resistance scale as the "first null point"; and will be found with the resistance nearly all in circuit or close to the zero of the scale— the scale divisions reading inversely as the resistance.

The reason that all this resistance is required is due to the fact that only a small part of the antenna circuit is necessary to balance out the weak current in the loop. The resistance is then decreased to a point where the stronger and low attenuation signal disappears, which will occur with the resistance nearly all out as most of the current in the antenna is necessary to cancel that in the loop.

The point on the resistance scale where this second cancellation occurs is noted and may be termed for convenience the "second null point". The distance between the two null points may then be translated into miles or other suitable units of distance on the resistance scale; and this is effected by a previous calibration.

It will be appreciated, of course, that readings by this method would, of necessity, be beyond the point of "natural balance", or the point of "equality".

In transmitting signals received by the various instruments to the station dial 85, it is preferable to provide against audio and radio feed-back from the powerful second amplifier necessary to operate the said station instrument, as by converting the energy from the last stage or push-pull amplifier into acoustical energy which is then reconverted into electrical energy.

This may conveniently be effected by providing in addition to the switch 86 a switch 160, which cuts in a receiver-microphone unit embodying the receiver 161 and microphone 162, it being understood, of course, that switch 86 is opened when the switch 160 is closed. The sound box 163 between receiver 161 and microphone 162, preferably of the magnetic type, should be of insulating material and should separate these units as much as possible to reduce capacity effects.

To calibrate the meter scales for direct reading of distance, the transmitter shown in Fig. 2 is set in operation and the receiving apparatus hereinbefore described placed either on a truck, plane or boat, depending on the type of vehicle upon which the apparatus will eventually be installed. With the receiving loop 11 held in line with the transmitting station and the antenna switch 13 opened and switch 20 thrown to include the said loop in the receiving circuit, a reading is taken as near the transmitter station as will be required in practice. If this location be within the point of "natural balance", then the transmitter should be provided with the coded sectors for identifying the signals of high and low attenuation in order that the operator subsequently may know whether he is within or without this point. The first reading will probably throw the needle violently off scale unless the adjustable shunt 79 is previously reduced to zero resistance and which should always be effected before taking the first reading. With zero resistance across the measuring instrument 78, the needle displacement from the true zero 80 will be very slight for both signals.

The shunt resistance is then increased gradually until the smaller reading of the needle is over the false zero; and if the receiver apparatus is located at the point of "natural balance", both readings of the needle will be at the same point, namely the false zero 81.

Should the receiver be located outside the point of "natural balance," then the weaker signal or smaller reading will be the signal of high attenuation; and with this needle adjusted to the false zero position 81 by means of the adjustable shunt 79, the rotating scale element 83 is rotated until its marking point 84 is over the longer throw of the needle which results from the reception of the signal of low attenuation. At that point a scale division is marked numbered with the distance in miles or other unit of distance.

The entire receiver is now moved to a greater predetermined distance and in a straight line from the transmitter, whereupon the operation is repeated, care being taken that the shorter throw of the needle is brought over the false zero point by means of the adjustable shunt. This change in predetermined distances is repeated over the range of the transmitter.

For calibrating the receiver in the aural method of determining distance, the vehicle upon which the receiver is mounted is in addition equipped with the antenna 10 and the switch 13 is closed to place the loop 12 in additive relation to the loop 11 and to the said antenna. The resistance 15 is then entirely cut out; and the receiver is moved to the point at which the nearest aural reading would be taken and which location is usually beyond the range of the transmitter for direct meter reading and thus beyond the point of "natural balance".

As soon as the weaker signal or signal of high attenuation constant is tuned in, switch 13 is thrown to the reverse position to place the coil 12 in opposition to loop 11 and thus reduce the strength of the received signal. The previously received signal will now be much weaker and the resistance 15 is adjusted until this weaker signal entirely disappears; and the movement is preferably continued beyond the point where the signal begins to reappear to better determine the first null point. When this point is located, the rotating dial 165, Fig. 6, is moved over the resistance until its zero position is over the null point just determined.

The stronger signal or signal of low attenuation constant is still audible; and the resistance arm is then gradually moved to cut out more resistance as before and until this second signal disappears by cancellation. Then, without moving the rotating dial, a figure is made thereon over the second null point on the resistance scale 166 and this figure corresponds to the distance from the transmitter as predetermined by actual measurement. Duplicate figures are now placed on each side of the zero of the dial as illustrated.

By moving the receiver to different distances from the transmitter in a direct line, and repeating the operations as hereinbefore described, to the full extent of the desired range, the calibration of the resistance scale 166 is completed.

Thereafter, to determine distance by the aural method, a null point for the weaker signal is first found by adjustment of the resistance 15, and the rotating dial then moved until its zero is over this point. The second null point is then similarly found and the figure on the rotating dial which corresponds to this point will give the distance in miles of the receiving station from the transmitting station.

More accurate reading by the null method may be effected by varying the coupling between coil 12 and loop 11, each time a reading is taken, until the null point for the weaker signal is always at the same point on the resistance scale, for example, approximately one-quarter of its range. When this is done, the rotating dial may be dispensed with and the distance in miles marked directly on the resistance as determined by the position of its arm in locating the second null point.

The attenuation of the receiver itself with its collectors of different characteristics, may be utilized to quickly approximate the distance, by providing the scale with only one null point (that found by a cancellation of the weaker signal of high attenuation) marked with the units of distance.

A check of the calibration may be effected as follows:

The transmitter is set in operation as hereinbefore described and the receiver placed upon a suitable moving vehicle, no antenna, however, being required. With the receiving loop 11 in tune with the transmitter, the signal of high attenuation is tuned in, although either signal may be utilized but one is required. It is necessary, however, to maintain the selected signal strictly throughout the calibration.

The local oscillator 100 is then adjusted to reproduce at maximum the required heterodyne note in the loud speaker 76, usually at about 700 vibrations per second. The local oscillator 105, however, is maintained inoperative and its pick-up coil 113 is located at the maximum distance on scale 115 from the receiver pick-up coil 114. The switch 20 having been thrown to a position to include the loop 11 in circuit with the receiver, a direct meter reading is taken as previously described, noting the throw of the needle for either the weak or the strong signal, as the case may be. The feedback coil should be moved away from the loop until no regeneration is produced, and fixed there throughout the measurement.

The local oscillator 105 is then placed in operation by closing switch 106, and condenser 111 is varied until the note in the loud speaker is pure and of a single tone. This condition may be brought about by tuning oscillator 105 to zero beat with the incoming signal and by being certain that the effective reception of coil 114 from oscillator 100 is the same as between the latter and the loop 11.

Switch 20 is then thrown to cut out the loop 11 and to include in circuit the pick-up coil 114. The meter reading will then be found to drop, but the pitch of the received note should be the same as before, although weaker in intensity. The pick-up coil 114 is then gradually moved nearer the coil 113 until the meter reading is the same as before, the distance between the two coils 114 and 113 affording then a measure of the actual distance of the receiving station from the transmitting station, which distance is then marked on the scale 115. The operation is thereupon repeated over the range desired.

Thereafter, to check one reading against another, a direct reading is taken from the meter, whereupon the local oscillator 105 is substituted for the signal, care being taken to insure that its B-battery voltage 109 and radio-frequency energy are maintained constant, as by means of the variable resistance 110 and through the readings afforded by meters 108 and 112.

While the circuits and apparatus hereinbefore described are indicated more or less diagrammatically, it will be appreciated that the receiving apparatus may all be conveniently located within a portable carrying case of convenient size.

I claim:

1. The method of determining, by radiant energy, the distance between transmitting and receiving units thereof, which comprises radiating alternately from the transmitting unit two electromagnetic waves respectively from a concentrated field and from a relatively distributed field, receiving the respective waves, and ascertaining the difference between their effects as a measure of the distance sought.

2. The method of determining, by radiant energy, the distance between transmitting and receiving units thereof, which comprises radiating alternately from the transmitting unit two electromagnetic waves respectively from a concentrated field and from a relatively distributed field, receiving the respective waves, and ascertaining the difference between their effects as a measure of the distance sought by first bringing the one received wave to a predetermined value and then comparing the effect of the other relatively thereto.

3. The method of determining, by radiant energy, the distance between transmitting and receiving units thereof, which comprises radiating alternately at different radiation powers electromagnetic waves of like frequency, receiving the respective waves, and ascertaining the difference between their effects as a measure of the distance sought.

4. The method of determining, by radiant energy, the distance between transmitting and receiving units thereof, which comprises radiating alternately at different radiation powers electromagnetic waves of like frequency, receiving the respective waves, translating said received waves into visual effects corresponding thereto, and ascertaining the difference between the visual effects as a measure of the distance sought by first bringing the one received wave to a predetermined visual value and then comparing the visual effect of the other relatively thereto.

5. The method of determining, by radiant energy, the distance between transmitting and receiving units thereof, which comprises radiating alternately at different radiation powers electromagnetic waves of like frequency, receiving the respective waves, translating said received waves into visual effects corresponding thereto, ascertaining the difference between their visual effects as a measure of the distance sought by first bringing the one received wave to a predetermined visual value and then comparing the visual effect of the other relatively thereto, and simultaneously therewith effecting an aural indication of the received energy.

6. The method of determining, by radiant energy, the distance between transmitting and receiving units thereof, which comprises radiating alternately at different radiation powers electromagnetic waves of like frequency and embodying signals of different identifying characteristics, receiving the respective waves, translating said received waves into visual effects corresponding thereto, and ascertaining the difference between their visual effects as a measure of the distance sought by first bringing the one received wave to a predetermined visual value and then comparing the visual effect of the other relatively thereto.

7. The method of determining, by radiant energy, the distance between transmitting and receiving units thereof, which comprises radiating alternately a plurality of differently attenuated electromagnetic waves of like frequency, receiving the respective waves, and ascertaining the difference between their effects as a measure of the distance sought.

8. The method of determining, by radiant energy, the distance between transmitting and receiving units thereof, which comprises radiating alternately two differently attenuated electromagnetic waves of like frequency and constant attenuation ratio, receiving the respective waves, and ascertaining the difference between their effects as a measure of the distance sought.

9. The method of determining, by radiant energy, the distance between transmitting and receiving units thereof, which comprises radiating alternately at different powers electromagnetic waves of like frequency, receiving the respective waves, subjecting the received waves to locally radiated waves of predetermined and constant frequency, and ascertaining the difference between their effects as a measure of the distance sought.

10. The method of determining, by radiant energy, the distance between transmitting and receiving units thereof, which comprises radiating alternately at different powers electromagnetic waves of like frequency, receiving the respective waves, subjecting the received waves to locally radiated waves of predetermined and constant frequency, translating said received waves into visual effects corresponding thereto, and ascertaining the difference between their visual effects as a measure of the distance sought by first bringing the one received wave to a predetermined visual value and then comparing the visual effect of the other relatively thereto.

11. The method of determining, by radiant energy, the distance between transmitting and receiving units thereof, which comprises radiating alternately at different powers electromagnetic waves of like frequency, receiving the respective waves, ascertaining the difference between their effects as a measure of the distance sought, subjecting the received waves to locally radiated waves of predetermined and constant frequency, and augmenting thereby the strength of one of the received waves to a greater degree than the other of the transmitted waves.

12. The method of determining, by radiant energy, the distance between transmitting and receiving units thereof, which comprises radiating alternately at different powers electromagnetic waves of like frequency, receiving the respective waves, and ascertaining a null point for each of the received waves, the difference therebetween being a measure of the distance sought.

13. The method of determining, by radiant energy, the distance between transmitting and receiving units thereof, which comprises radiating alternately at different powers electromagnetic waves of like frequency, receiving on the said receiving unit alternately a locally generated electromagnetic wave of constant frequency and amplitude and an electromagnetic wave from the transmitting unit at the same frequency and of varying amplitude, and comparing the amplitudes of the received waves as a measure of the distance sought.

14. The method of determining, by radiant energy, the distance between transmitting and receiving units thereof, which comprises radiating alternately at different powers electromagnetic waves of like frequency, receiving the respective waves, substituting a local source of electromagnetic waves of like frequency and known value for the received electromagnetic waves, and varying the distance between the local source and the receiving unit for the waves from the transmitting unit until the effect of the locally generated electromagnetic waves is the same as the effect produced by the electromagnetic waves received from the transmitting unit, the degree of variation being a measure of the distance sought.

15. The method of determining, by radiant energy, the distance between transmitting and receiving units thereof, which comprises radiating and receiving an electromagnetic wave train, substituting a locally developed electromagnetic wave train of like frequency and known value for the received train, and varying the distance between the source of the locally developed wave train and the receiving unit for the wave train from the transmitting unit until the effect of the former is the same as the effect produced by the latter, the degree of variation being a measure of the distance sought.

16. In a system of the character set forth: a plurality of transmitting antennæ adapted for electromagnetic waves of like frequency, and different radiating powers; means to alternately radiate the waves of different power characteristics; a receiving antenna, and circuit tuned to the transmitted waves; instrumentalities subject to the effect of the different received waves; and means to adjust the effects on said instrumentalities.

17. In a system of the character set forth: a plurality of transmitting antennæ adapted for electromagnetic waves of like frequency; a high frequency generator adapted to be successively connected to the respective antennæ; means to adjust the power delivered thereto to afford successively radiated electromagnetic waves of different powers; a receiving antenna, and circuit tuned to the transmitted waves; instrumentalities subject to the effect of the different received waves; and means to adjust the effects on said instrumentalities.

18. In a system of the character set forth: a plurality of loop type radiators for electromagnetic waves; condensers connected in series with the respective radiators, a high frequency generator adapted to be successively connected to the respective antennæ; means to adjust the power delivered thereto to afford sucessively radiated electromagnetic waves of different radiation powers; a receiving antenna, and circuit tuned to the transmitted waves; instrumentalities subject to the effect of the different received waves; and means to adjust the effects on said instrumentalities.

19. In a system of the character set forth: two loop type radiators for electromagnetic waves of like frequency, the one radiator having relatively good radiating properties and the other inferior radiating properties, means to primarily energize equally both of said radiators; a receiving antenna, and circuit tuned to the transmitted waves; instrumentalities subject to the effect of the different received waves; and means to adjust the effects on said instrumentalities.

20. In a system of the character set forth: two loop type radiators for electromagnetic waves of like frequency, the one radiator having relatively good radiating properties and the other inferior radiating properties, means to primarily energize the latter radiator with a relatively large amount of power and the former with a lesser amount of power; a receiving antenna, and circuit tuned to the transmitted waves; instrumentalities subject to the effect of the different received waves; and means to adjust the effects on said instrumentalities.

21. In a system of the character set forth: a plurality of loop type radiators for electromagnetic waves; condensers connected in series with the respective radiators, a high frequency generator adapted to be successively conrected to the respective antennæ; signal producing means adapted to be included in circuit with said alternator and the antennæ; means to adjust the power delivered thereto to afford successively radiated electromagnetic waves of different powers; a receiving antenna, and circuit tuned to the transmitted waves; instrumentalities subject to the effect of the different received waves; and means to adjust the effects on said instrumentalities.

22. In a system of the character set forth: a plurality of loop type radiators for electromagnetic waves; condensers connected in series with the respective radiators, a high frequency generator adapted to be successively connected to the respective antennæ; signal producing means provided with different identifying signals, one for each of the respective antennæ and adapted to be included in circuit therewith and with the alternator; means to adjust the power delivered thereto to afford successively radiated electromagnetic waves of different radiation powers; a receiving antenna, and circuit tuned to the transmitted waves; instrumentalities subject to the effect of the different received waves; and means to adjust the effects on said instrumentalities.

23. In a system of the character set forth: a plurality of loop type radiators for electromagnetic waves; condensers connected in series with the respective radiators, a high frequency generator adapted to be successively connected to the respective antennæ; means to adjust the power delivered thereto to afford successively radiated electromagnetic waves of different radiation powers; a receiving antenna, and circuit tuned to the transmitted waves; instrumentalities subject to the effect of the different received waves; means to adjust the effects on said instrumentalities; and means to differentially affect the received waves.

24. In a system of the character set forth: a plurality of loop type radiators for electromagnetic waves; condensers connected in series with the respective radiators, a high frequency generator adapted to be successively connected to the respective antennæ; means to adjust the power delivered thereto to afford successively radiated electromagnetic waves of different radiation powers; a receiving antenna, and circuit tuned to the transmitted waves; instrumentalities subject to the effect of the different received waves; means to adjust the effects on said instrumentalities; and a local oscillator device associated with the receiving antenna and adapted to heterodyne the incoming waves.

25. In a system of the character set forth: a plurality of loop type radiators for electromagnetic waves; condensers connected in series with the respective radiators, a high frequency generator adapted to be successively connected to the respective antennæ; means to adjust the power delivered thereto to afford successively radiated electromagnetic waves of different radiation powers; a receiving antenna, and circuit tuned to the transmitted waves; instrumentalities subject to the effect of the different received waves; means to adjust the effects on said instrumentalities; means to disconnect the receiving antenna; an auxiliary receiving coil adapted to be connected to the receiving circuit; and a local oscillator device associated with said auxiliary coil.

26. In a system of the character set forth: a plurality of loop type radiators for electromagnetic waves; condensers connected in series with the respective radiators, a high frequency generator adapted to be successively connected to the respective antennæ; means to adjust the power delivered thereto to afford successively radiated electromagnetic waves of different radiation powers; a receiving antenna, and circuit tuned to the transmitted waves; instrumentalities subject to the effect of the different received waves; means to adjust the effects on said instrumentalities; means to disconnect the receiving antenna; an auxiliary receiving coil adapted to be connected to the receiving circuit; and a local oscillator device adjustably associated with said auxiliary coil.

In testimony whereof I affix my signature.

EDWARD G. GAGE.

CERTIFICATE OF CORRECTION.

Patent No. 1,828,531.                      Granted October 20, 1931, to

EDWARD G. GAGE.

It is hereby certified that the name of the second mentioned assignee in the above numbered patent was erroneously written and printed as "Leon Attinger", whereas said name should have been written and printed as Leon Ottinger, as shown by the records of assignments in this office; and that the said Letters Patent should be read with this correction therein that the same may conform to the record of the case in the Patent Office.

Signed and sealed this 9th day of February, A. D. 1932.

M. J. Moore,
Acting Commissioner of Patents.

(Seal)